(12) United States Patent
Schlangen et al.

(10) Patent No.: US 7,828,108 B2
(45) Date of Patent: Nov. 9, 2010

(54) REAR DRIVE AND SUSPENSION FOR AN ALL TERRAIN VEHICLE

(75) Inventors: Adam J Schlangen, Rush City, MN (US); Jeffrey D Bennett, Roseau, MN (US); Brian T Utter, Greenbush, MN (US); Stephen L Nelson, Osceola, MN (US)

(73) Assignee: Polaris Industries, Inc., Medina, MN (US)

( * ) Notice: Subject to any disclaimer, the term of this patent is extended or adjusted under 35 U.S.C. 154(b) by 246 days.

(21) Appl. No.: 11/528,889

(22) Filed: Sep. 27, 2006

(65) Prior Publication Data
US 2007/0193813 A1 Aug. 23, 2007

Related U.S. Application Data

(60) Provisional application No. 60/813,597, filed on Feb. 1, 2006.

(51) Int. Cl.
*B60K 17/28* (2006.01)
(52) U.S. Cl. ........................ 180/357; 180/384
(58) Field of Classification Search ................ 180/291, 180/337, 348, 357, 370, 383, 384; 277/212 FB, 277/504, 634, 122 FB; 280/124.134, 124.135, 280/124.139, 124.156; 188/218 XL, 18 A; 192/218, 221, 221.1
See application file for complete search history.

(56) References Cited

U.S. PATENT DOCUMENTS

| 2,432,803 | A | * | 12/1947 | Rice | 464/7 |
| 2,751,029 | A | * | 6/1956 | Dixon | 180/244 |
| 2,936,035 | A | * | 5/1960 | Hill | 180/244 |
| 3,218,827 | A | 11/1965 | Aucktor | |
| 3,439,786 | A | * | 4/1969 | Schmid | 475/84 |
| 3,472,090 | A | * | 10/1969 | Dawe | 474/162 |
| 4,300,651 | A | 11/1981 | Krude | |
| 4,557,491 | A | * | 12/1985 | Orain | 277/636 |
| 4,561,518 | A | * | 12/1985 | Grinde | 180/215 |
| 4,786,075 | A | * | 11/1988 | Takahashi | 180/254 |
| 4,848,521 | A | * | 7/1989 | Izumine | 188/18 A |

(Continued)

FOREIGN PATENT DOCUMENTS

DE 19755307 12/1997

(Continued)

OTHER PUBLICATIONS

International Searching Authority/Stierman, Ernst, European Patent Office, International Search Report & Written Opinion PCT/US2006/048369, Aug. 16, 2007, 11 pages.

*Primary Examiner*—Paul N Dickson
*Assistant Examiner*—Karen Jane J Amores
(74) *Attorney, Agent, or Firm*—Baker & Daniels LLP

(57) ABSTRACT

A vehicle, including an independent rear suspension and a rear drive mechanism including a pair of dual offset joints mounted in a sprocket hub. Each dual offset joint is connected to a half shaft coupled to a wheel. A driven sprocket is connected to the sprocket hub at a location offset from a centerline of the vehicle. An external chain coupled to a drive sprocket coupled to the vehicle's engine and the driven sprocket to transfer rotational movement of the drive sprocket to the driven sprocket, thereby causing rotation of the sprocket hub, the dual offset joints, the half shafts, and the wheels.

25 Claims, 12 Drawing Sheets

U.S. PATENT DOCUMENTS

| | | | |
|---|---|---|---|
| 5,007,154 A | 4/1991 | Kamata et al. | |
| 5,251,713 A | 10/1993 | Enokimoto | |
| 5,725,453 A | 3/1998 | Zalewski et al. | |
| 5,823,904 A * | 10/1998 | Hodjat et al. | 474/170 |
| 5,951,401 A | 9/1999 | Kita et al. | |
| 5,992,587 A * | 11/1999 | Maldonado | 188/344 |
| 6,280,336 B1 | 8/2001 | Sone et al. | |
| 6,283,255 B1 * | 9/2001 | Gardner et al. | 188/18 A |
| 6,319,132 B1 * | 11/2001 | Krisher | 464/143 |
| 6,426,033 B1 * | 7/2002 | Wette et al. | 264/459 |
| 6,488,110 B2 * | 12/2002 | Price | 180/251 |
| 6,533,060 B1 * | 3/2003 | Seto | 180/337 |
| 6,749,039 B1 * | 6/2004 | Uphaus | 180/357 |
| 6,869,226 B2 | 3/2005 | Henkel et al. | |
| 6,883,630 B2 * | 4/2005 | Morin | 180/244 |
| 7,097,568 B2 * | 8/2006 | Kuczera et al. | 464/173 |
| 7,311,167 B2 * | 12/2007 | Takayanagi et al. | 180/215 |
| 7,614,476 B2 * | 11/2009 | Seki | 180/373 |
| 2001/0052435 A1 * | 12/2001 | Montague | 180/350 |
| 2002/0063010 A1 * | 5/2002 | Morin | 180/336 |
| 2003/0013613 A1 * | 1/2003 | Balachandran et al. | 505/100 |
| 2003/0146593 A1 * | 8/2003 | Seki | 280/124.134 |
| 2003/0236122 A1 | 12/2003 | Blumke et al. | |
| 2004/0011584 A1 | 1/2004 | Henkel et al. | |
| 2004/0051255 A1 * | 3/2004 | Masunaga et al. | 277/634 |
| 2004/0195797 A1 | 10/2004 | Nash et al. | |
| 2005/0103553 A1 | 5/2005 | Korenjak et al. | |
| 2005/0173180 A1 | 8/2005 | Hypes et al. | |
| 2007/0074925 A1 * | 4/2007 | Seki et al. | 180/374 |
| 2007/0142162 A1 * | 6/2007 | Seki et al. | 476/40 |
| 2007/0193815 A1 * | 8/2007 | Hobbs | 180/348 |
| 2007/0228683 A1 * | 10/2007 | Ciasulli | 280/124.1 |
| 2007/0238535 A1 * | 10/2007 | Wormsbaecher | 464/141 |

FOREIGN PATENT DOCUMENTS

| | | | |
|---|---|---|---|
| JP | 63-90486 | * | 4/1988 |
| WO | WO 2005/095142 | | 10/2005 |

* cited by examiner

REAR DRIVE AND SUSPENSION FOR AN ALL TERRAIN VEHICLE

RELATED APPLICATIONS

This application claims priority to U.S. Provisional Application Ser. No. 60/813,597, filed Feb. 1, 2006, the disclosure of which is expressly incorporated herein by reference.

FIELD OF THE INVENTION

The present invention generally relates to all terrain vehicles (ATVs), and more particularly to an external chain-driven ATV with an independent rear suspension system.

BACKGROUND OF THE INVENTION

ATVs are popular multipurpose vehicles that are generally grouped into two categories: sport/high performance ATVs and utility ATVs. Sport ATVs are typically designed for high speed use, such as racing, and are thus lighter and faster than utility ATVs, which are used for activities such as hunting, camping and working. Sport ATVs are usually equipped with rear wheel drive and swing arm rear suspension, whereas utility ATVs are usually rear wheel drive with swing arm or independent rear suspension.

It is desirable to provide an ATV, particularly a high performance ATV, that is as light as possible, yet powerful and durable, with high quality ride characteristics. Many conventional ATVs provide some combination of power, durability and desirable ride characteristics, but at the expense of added weight.

SUMMARY OF THE INVENTION

The present invention provides an ATV having an independent rear suspension system and a rear drive mechanism with a drive sprocket offset from the centerline of the ATV that is driven by an external chain and a dual offset joint for driving extended length half shafts. The independent rear suspension and drive mechanism provide enhanced ride characteristics, and the external chain is an efficient, light weight power transfer mechanism.

The features of the present invention described above, as well as additional features, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention. Additionally, while the vehicle of the following description is an ATV, it should be understood that the invention may have application to other types of vehicles such as dune buggies and other off-road vehicles.

Figure 1:
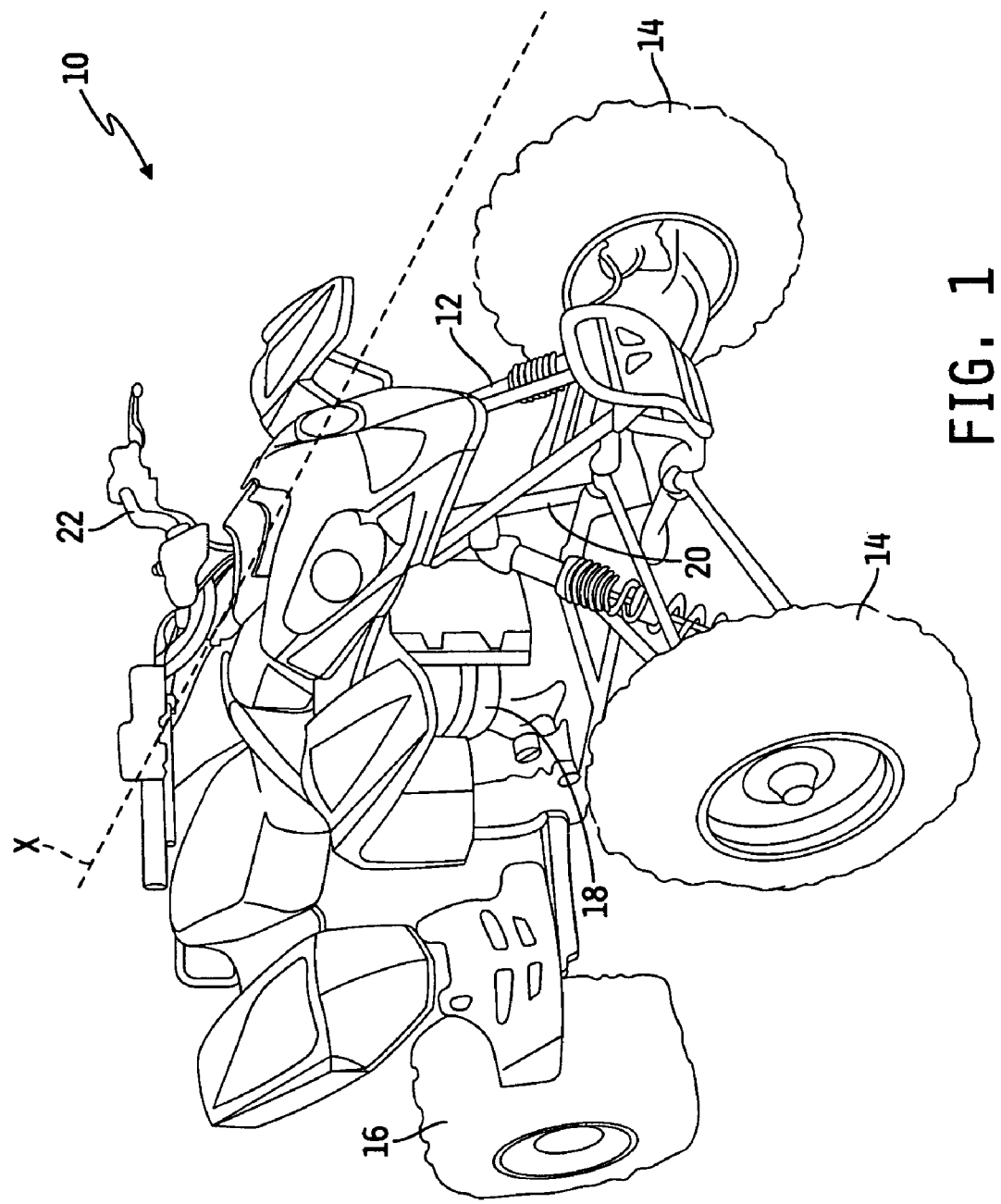
FIG. 1 is a perspective view of an ATV.

Referring now to FIG. 1, an ATV 10 according to the present invention generally includes a chassis 12, two front tires 14, two rear tires 16, an engine 18 supported on chassis 12 for providing power to rear tires 16, a steering post 20 operatively connected to front tires 14, and a steering control 22 (e.g., handle bars) coupled to steering post 20 for rotating steering post 20 to effect steering of ATV 10. It should be understood that while a particular configuration of chassis 20 is shown in the figures described below, any of a variety of different configurations may be used to support the various components of ATV 10. For example, many of the various support elements may have shapes and sizes that are different from those shown while still employing the teachings of the present invention.

Engine 18 may be any propulsion device suitable for propelling ATV 10, such as a 2-cycle or 4-cycle reciprocating internal combustion engine. Generally, such engines transfer energy from reciprocating pistons to a rotating crankshaft, which in turn drives a transmission. For purposes of the present invention, any transmission, such as a manual geared transmission or a continuously variable transmission, may be used. In the embodiments depicted and described below, the engine and transmission are a single unit.

Figure 2:
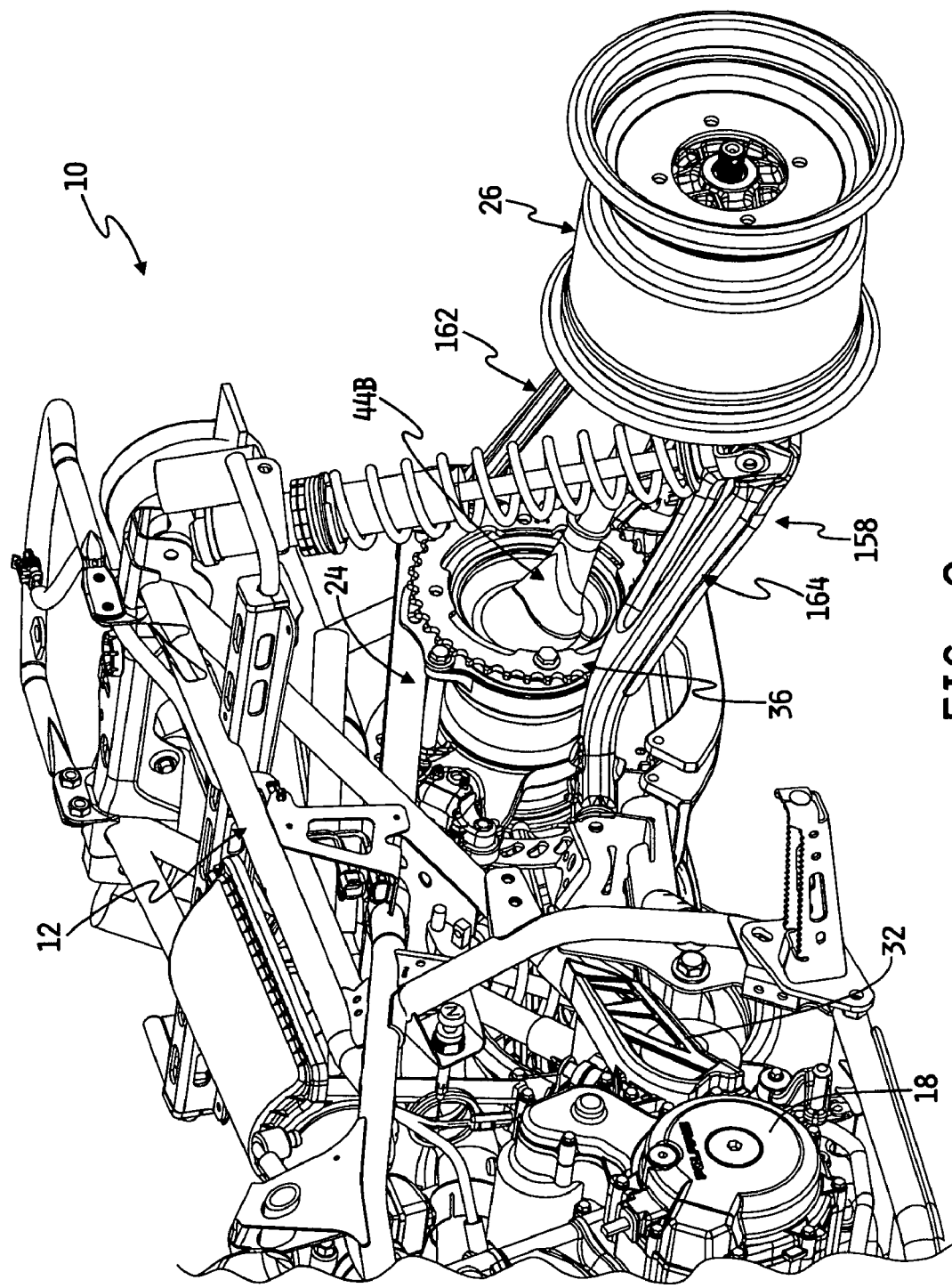
FIG. 2 is a perspective view of a partially disassembled ATV embodying features of the present invention.
Figure 3:
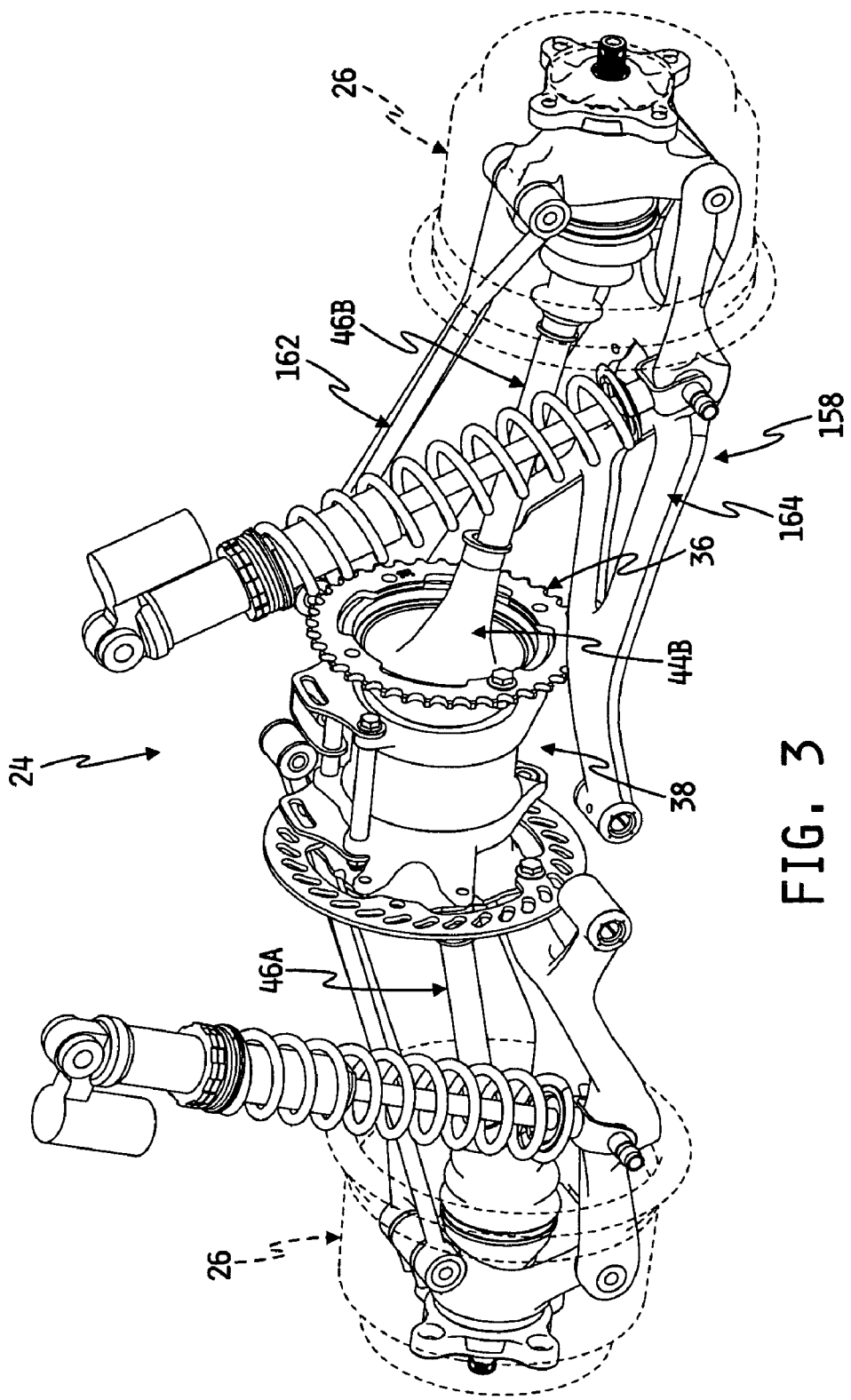
FIG. 3 is a perspective view of a drive mechanism and independent rear suspension according to the present invention.
Figure 4:
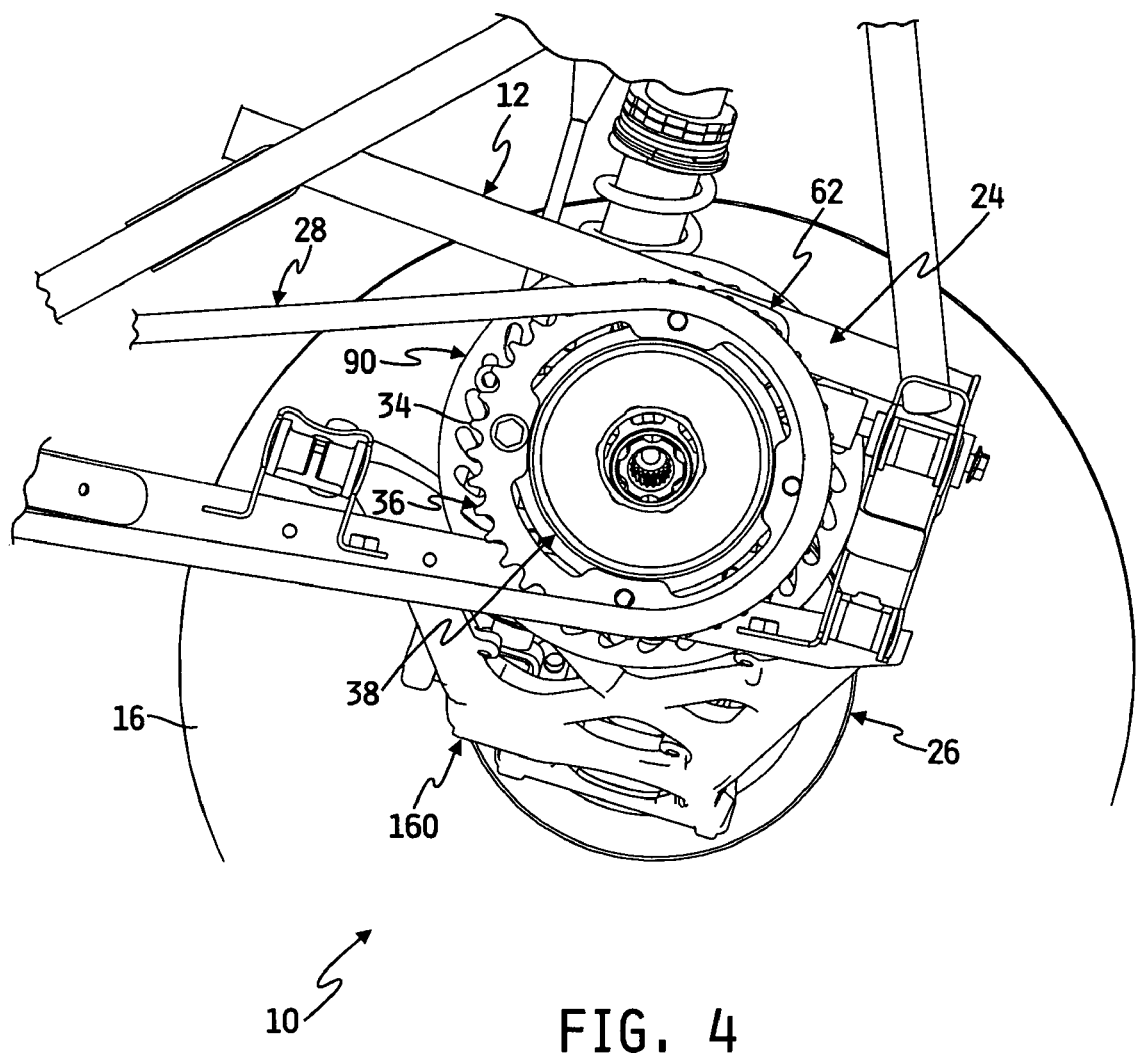
FIG. 4 is a partially fragmented, side elevational view of portions of the drive mechanism and independent rear suspension of FIG. 3.
Figure 5:
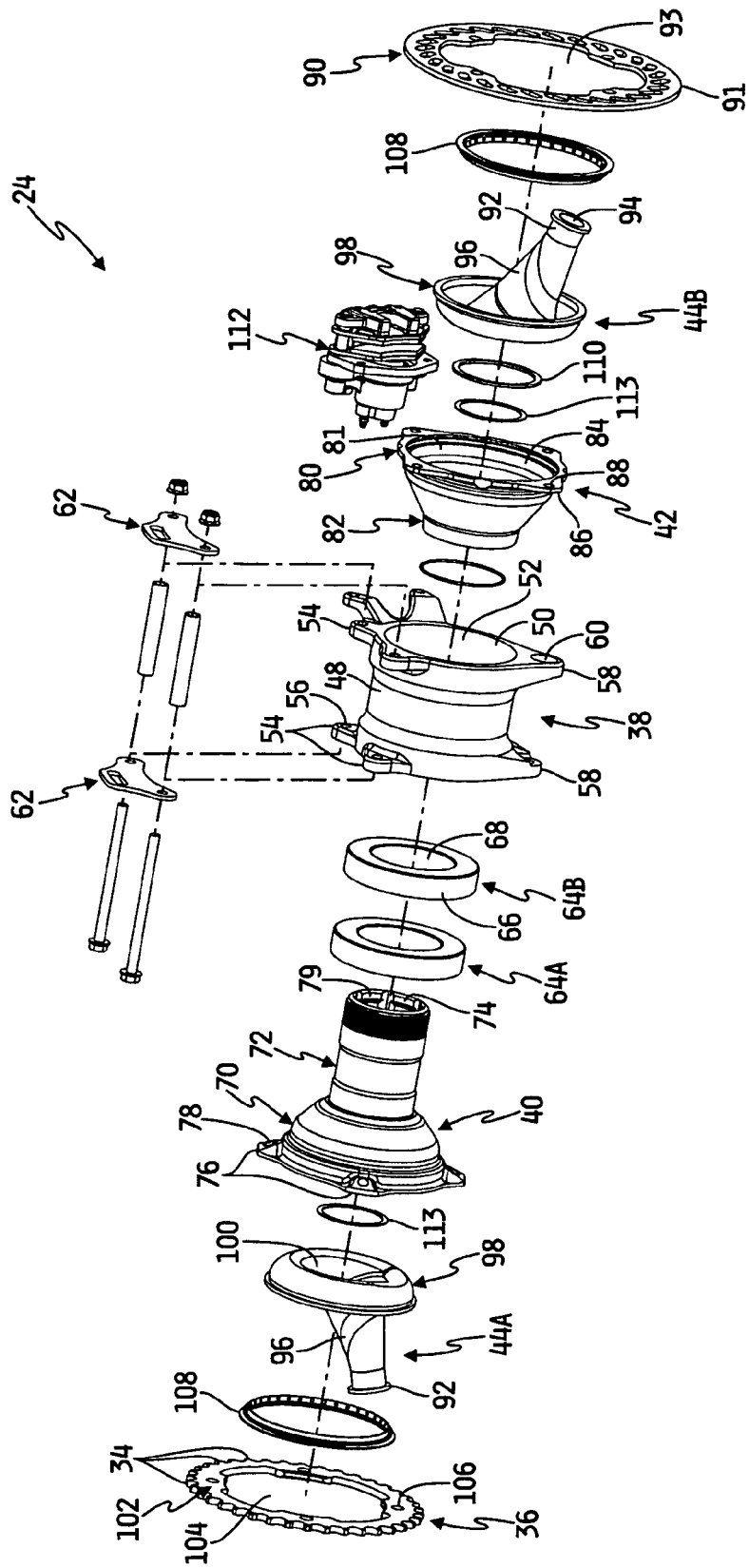
FIG. 5 is an exploded, perspective view of the drive mechanism of FIG. 3.

Referring now to FIGS. 2 through 4, in one embodiment of the invention, energy is transferred from engine 18 to a drive mechanism 24 configured to cause rotation of rear wheel rims 26, which of course causes rotation of rear wheels 16. In this embodiment, an external chain 28 (FIG. 4) transfers energy from engine 18 to drive mechanism 24. More specifically, chain 28 includes a plurality of links coupled together to form a single loop. The links of chain 28 mesh with the teeth (not shown) of a drive sprocket 32 connected to the output drive shaft of the transmission, and with teeth 34 of a driven sprocket 36 coupled to drive mechanism 24 as is further described below. As should be understood from the foregoing, as engine 18 causes rotation of drive sprocket 32, chain 28 transfers energy to driven sprocket 36, the rotational energy of which is transferred to rear wheels 16 by drive mechanism 24 as is further described below. As compared to conventional internal chains and drive shafts, chain 28 is generally lighter and transmits power with greater efficiency.

Figure 6:
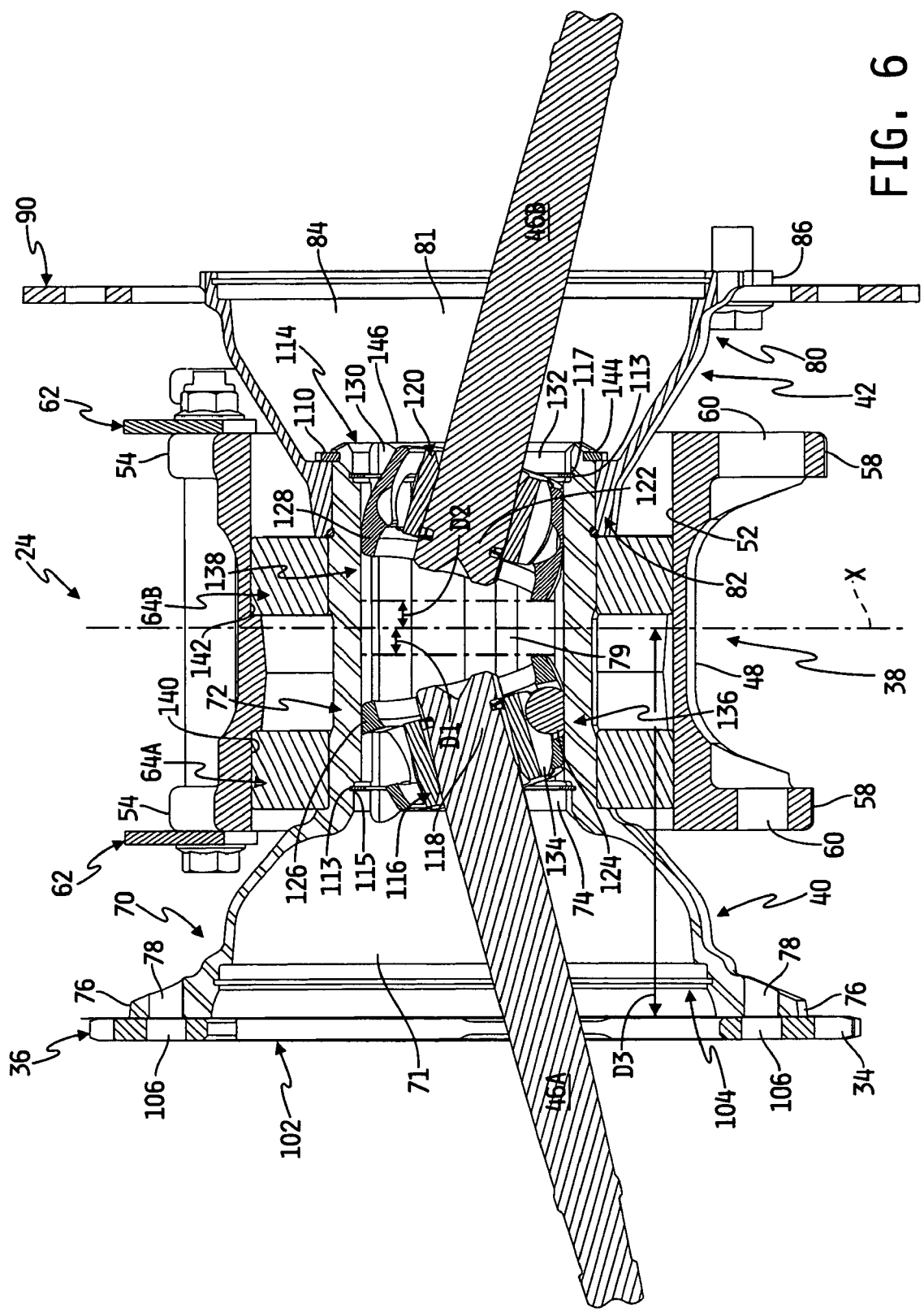
FIG. 6 is a cross-sectional view of the drive mechanism of FIG. 3.

Referring now to FIGS. 2 through 6, in addition to driven sprocket 36, drive mechanism 24 generally includes a housing 38, a sprocket hub 40, a brake hub 42, a pair of inner boots 44A, 44B, and a pair of half-shafts 46A, 46B (see FIGS. 3 and 6). Housing 38 includes an outer wall 48 that forms a pair of opposed, cylindrically-shaped cavities 50 (only one shown), for receiving bearings 64A, 64B and to provide clearance for sprocket hub 40 and brake hub 42, and a substantially cylindrical inner surface 52 connecting cavities 50. Housing 38 further includes a plurality of upper flanges 54 having apertures 56, and a pair of lower flanges 58 having apertures 60. In one embodiment, a bracket assembly 62 is connected to upper flanges 54 and is configured for connection to chassis 12. Apertures 60 of lower flanges 58 are configured to receive bolts (not shown), also for connecting housing 38 to chassis 12.

As is further described below, a pair of bearings 64A, 64B are fitted into housing 38 at inner surface 52. Each bearing 64A, 64B includes an outer ring 66 and an inner ring 68 that is rotatable relative to outer ring 66 on internal bearings elements (not shown).

Sprocket hub 40 generally includes a bell-shaped end 70 having an inner surface 71 and a substantially cylindrical body 72, together forming an interior space 74. Bell-shaped end 70 includes a plurality of mounting flanges 76 having apertures 78 for use in attaching driven sprocket 36 to sprocket hub 40 as described below. In one embodiment of the invention, body 72 defines an uninterrupted internal volume 79 which houses the dual offset joint described below.

Brake hub 42 similarly includes a bell-shaped end 80 (having an inner surface 81) that tapers to a reduced diameter end 82, which together form an interior space 84. Bell-shaped end 80 includes a plurality of mounting flanges 86 having apertures 88 that receive conventional fasteners which attach brake rotor 90 to brake hub 42. Brake rotor 90 includes a body 91 that defines a central opening 93. As should be apparent from the foregoing, brake rotor 90 transfers braking force to drive mechanism 24 to impede rotation of sprocket hub 40.

As is further described below, inner boot 44A is attached to bell-shaped end 70 of sprocket hub 40 and inner boot 44B is attached to bell-shaped end 80 of brake hub 42. In general, inner boots 44A, 44B protect the moving parts of the joints driving half-shafts 46A, 46B (described below with reference to FIG. 6) from dirt and debris, and retain lubrication within the enclosed volume of the boot 44A, 44B. Each boot 44A, 44B includes a narrow end 92 having an inner surface 94 that is sized to tightly seal over the outer surface of a corresponding half shaft 46A, 46B, a central body 96, and an attachment end 98. Inner surface 94 extends into the internal volume 100 of each boot 44A, 44B. Half-shafts 46A, 46B extend through internal volumes 100 for connection to a dual offset joint (DOJ), as is described in detail below.

Driven sprocket 36 includes a body 102 forming a central opening 104. The plurality of teeth 34 (mentioned above) extend along the outer perimeter of body 102. A plurality of openings 106 are formed in body 102, and are spaced to correspond to the spacing of mounting flange apertures 78 of bell-shaped end 70 of sprocket hub 40. In the described embodiment, a plurality of fasteners (not shown) are passed through openings 106 and apertures 78 to secure driven sprocket 36 to sprocket hub 40. It should be understood, however, that any of a variety of connection methods may be used to couple driven sprocket 36 to sprocket hub 40, such as a splined interface or permanent connection (e.g., a welded connection). Use of different diameter driven sprockets 36 may provide different gearing ratios for ATV 10.

As is further described below, drive mechanism 24 further includes a pair of snap rings 108, a retainer ring 110, a brake caliper 112, and a pair of joint retainer rings 113.

Referring now to FIG. 6, a pair of dual-offset joints (DOJ) 114 are shown within body 72 of sprocket hub 40. Each DOJ 114 includes a left race 116 attached at a splined interface (not shown) to end 118 of half shaft 46A, a right race 120 attached at a splined interface (not shown) to end 122 of half shaft 46B, a plurality of balls 124, a left cage 126, a right cage 128, and a plurality of drive grooves 130 formed on the interior surface 132 of body 72. Each race 116, 120 includes a plurality of ball grooves 134 that receive balls 124 and permit plunge movement of half shafts 46A, 46B (i.e., axial movement of half shafts 46A, 46B toward and away from one another). Balls 124 are retained within ball grooves 134 by a corresponding plurality of openings (not shown) formed through cages 126, 128. Together, race 116, balls 124, and cage 126 form a left constant velocity joint 136, and race 120, balls 124, and cage 128 form a right constant velocity joint 138. Balls 124 extend through the openings of cages 126, 128 and ride within drive grooves 130 on interior surface 132. To further accommodate the plunge movement of half shafts 46A, 46B, balls 124 may also move along drive grooves 130. The total plunge movement of half shafts 46A, 46B is limited by the geometry of the independent rear suspension described below. Half shaft 46A extends from joint 136, through central opening 104 of driven sprocket 36, to a wheel rim 26. Similarly, half shaft 46B extends from joint 138, through central opening 93 of brake rotor 90, to a wheel rim 26.

As shown in FIG. 6, each of joints 136, 138 are positioned adjacent the centerline (depicted as dotted line "X" in FIGS. 1 and 6) of ATV 10. Moreover, driven sprocket 36 is offset relative to centerline "X" such that, in the depicted embodiment, left joint 136 is positioned between sprocket 36 and right joint 138. More specifically, the distance "D1" between joint 136 and centerline "X," which is substantially equal to the distance "D2" between joint 138 and centerline "X," is less than the distance "D3" between sprocket 36 and centerline "X." The offset position of sprocket 36 is desirable in that it may be configured for alignment with the offset position of drive sprocket 32 provided by a conventional engine 18 without requiring jack shafts or other additional hardware. In other words, the offset position of sprocket 36 permits use of standard engines 18 without the need for special accommodations to permit connection of drive sprocket 32 to driven sprocket 36 by chain 28.

Additionally, the hourglass shaped assembly of sprocket hub 40 and brake hub 42, substantially centered about centerline "X," provides a desirable mounting location for brake rotor 90. As should be apparent to those skilled in the art, mounting brake rotor 90 directly to drive mechanism 24, as opposed to mounting brake rotor 90 to wheel rim 26, simultaneously applies stopping force (through sprocket hub 40) to both rear wheels 16, reduces the torque on the IRS units 158, 160 that would be applied by wheel mounted brakes, eliminates the need to run connections to brake calipers out at wheel rim 26, moves the weight of the brakes inboard from the wheels, and provides additional packaging room at the wheels.

Upon assembly, bearing 64A is pressed into a channel 140 formed on inner surface 52 of housing 38. Body 72 of sprocket hub 40 is then passed through bearing 64A and pressed into place. Next, bearing 64B is passed over body 72 and pressed into a channel 142 formed on inner surface 52. The interior splined surface (not shown) of reduced diameter end 82 of brake hub 42 is then pressed onto the exterior splined surface (not shown) of body 72. Reduced diameter end 82 passes over a circumferential groove 144 formed at end 146 of body 72. Retainer ring 110 is then snapped into groove 144 to retain brake hub 42 on body 72.

Next, left joint 136 is pressed onto end 118 of half shaft 46A and right joint 138 is pressed onto end 122 of half shaft 46B. After a suitable lubricant is applied to drive grooves 130, left joint 136 is passed through bell-shaped end 70 of sprocket hub 40 and positioned into interior space 74 of body 72 such that balls 124 ride within drive grooves 130 as shown in FIG. 6. Joint retainer ring 113 is passed over half shaft 46A and positioned within a groove 115 formed within sprocket hub 40 to prevent unwanted removal of half shaft 46A. Similarly, right joint 138 is passed through bell-shaped end 80 of brake hub 42 and positioned into interior space 74, and the other joint retainer ring 113 is placed within a groove 117 formed within sprocket hub 40.

Figure 7:
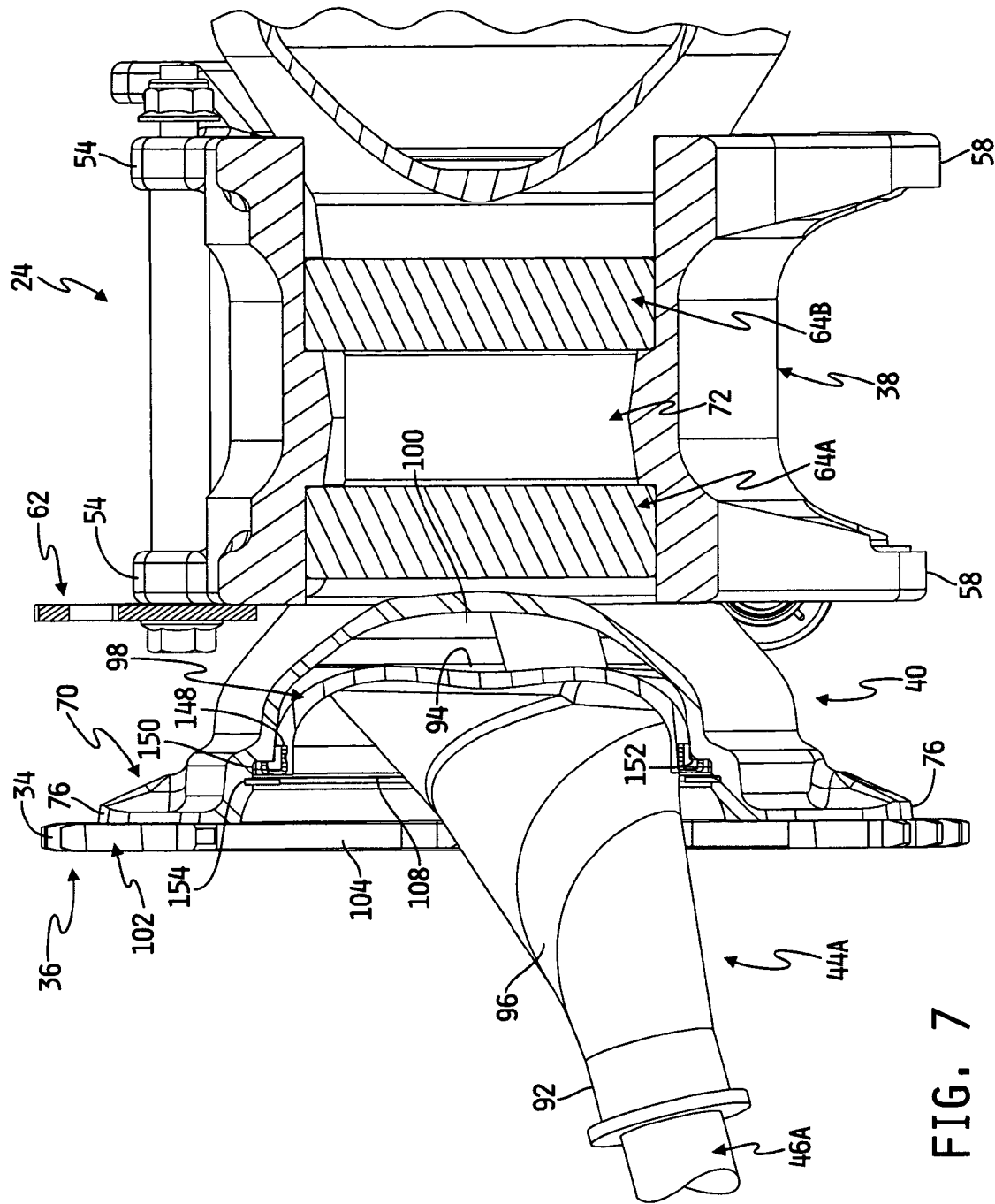
FIG. 7 is a partially fragmented, cross-sectional view of the drive mechanism of FIG. 3.
Figure 8:
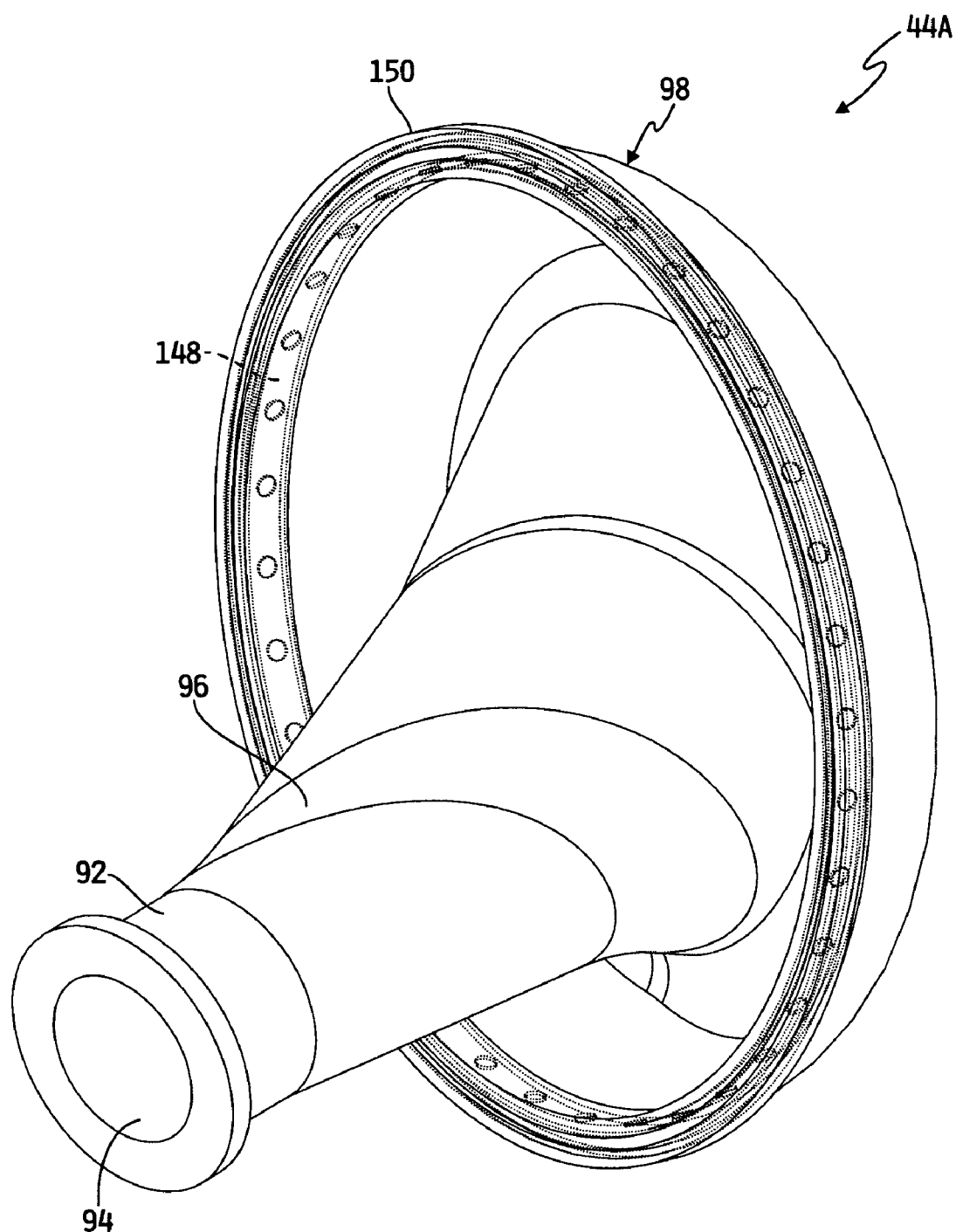
FIG. 8 is a perspective view of an inner boot according to the present invention.

Boots 44A, 44B are then passed over half shafts 46A, 46B respectively, such that attachment ends 98 fit within bell-shaped ends 70, 80 respectively. Referring to FIGS. 7 and 8, boot 44A includes an integral reinforcement ring 148. Ring 148 may be metallic or formed from other suitably strong material, and be molded into or otherwise integrated with or securely attached to the outer lip 150 of attachment end 98 of boot 44A. When boot 44A is installed, outer lip 150 rests against a seat 152 formed in bell-shaped end 70 of sprocket hub 40. Next, snap ring 108 is forced into a circumferential groove 154 formed in bell-shaped end 70 adjacent seat 152. Snap ring 108 retains lip 150 in place against seat 152, which retains boot 44A in place relative to sprocket hub 40. Reinforcement ring 148 provides rigidity to outer lip 150 and decreases the possibility that outer lip 150 will become disengaged from seat 152. Boot 44B is attached to brake hub 80 in a similar manner. It should be understood that boots 44A, 44B are mounted internal to sprocket hub 40 and brake hub 80 (i.e., on seats 152) without appreciable interference with the movement of half shafts 46A, 46B.

As would be apparent to one of ordinary skill in the art, an additional CV joint protected by a boot is disposed at each of the outer ends of half shafts 46A, 46B to connect the half shafts 46A, 46B to respective wheel rims 26.

In operation, engine 18 causes rotation of chain 28, which meshes with teeth 34 of driven sprocket 36, thereby causing rotation of driven sprocket 36. As driven sprocket 36 rotates, sprocket hub 40 rotates within bearings 64A, 64B disposed within housing 38, which is fixed to frame 12. Of course, brake hub 42 and rotor 90 also rotate as they are rigidly attached to sprocket hub 40. As sprocket hub 40 rotates, balls 124 which are fitted into drive grooves 130 also rotate, causing rotation of left joint 136 and right joint 138. Rotation of joints 136, 138 causes corresponding rotation of half shafts 46A, 46B, respectively, as half shafts 46A, 46B are rigidly connected to races 116, 120, respectively. Of course, rotation of half shafts 46A, 46B causes rotation of rear wheels 16, thereby propelling ATV 10 in a forward or reverse direction, depending upon the direction of rotation.

Figure 9:
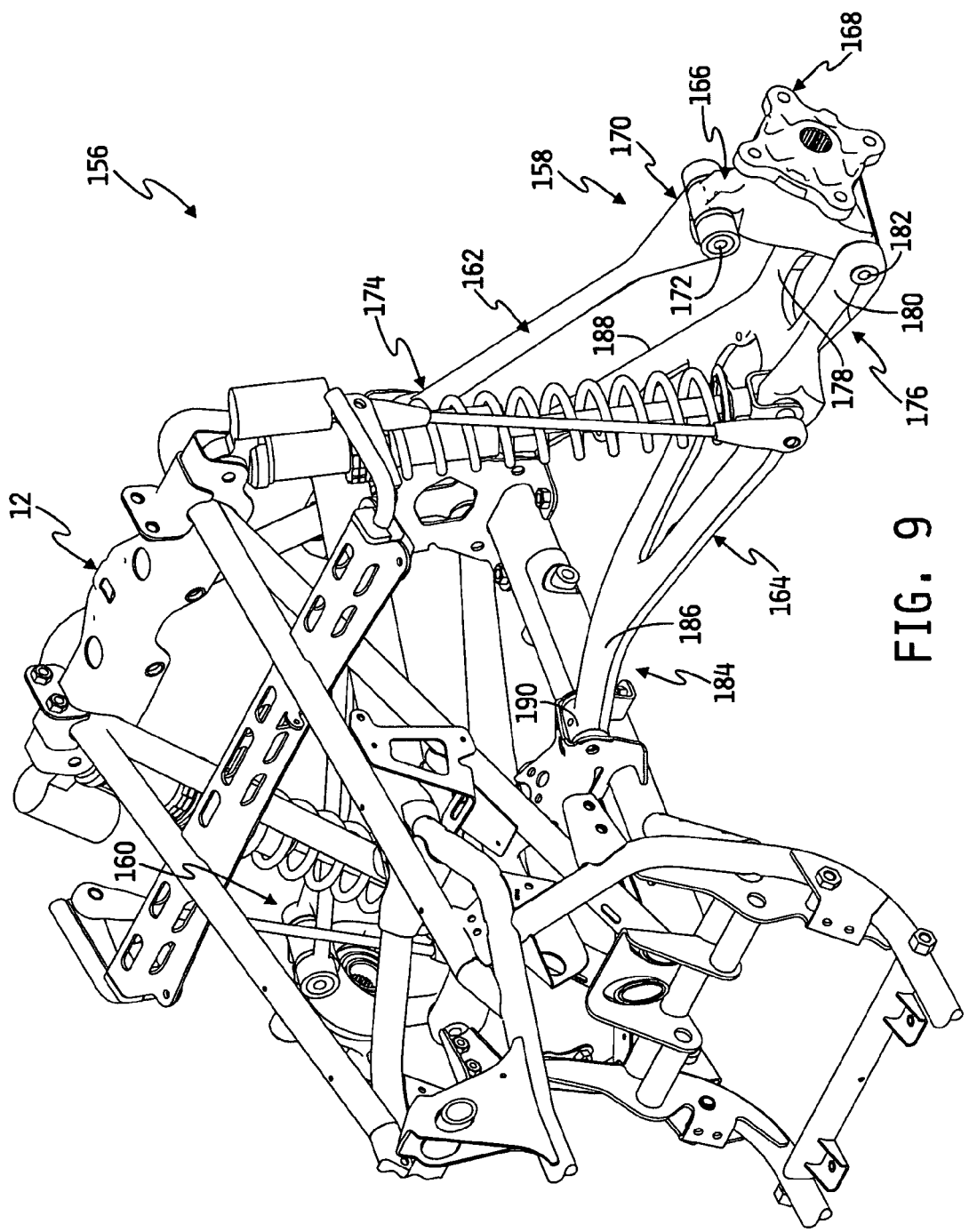
FIG. 9 is a perspective view of the independent rear suspension of FIG. 3.
Figure 10:
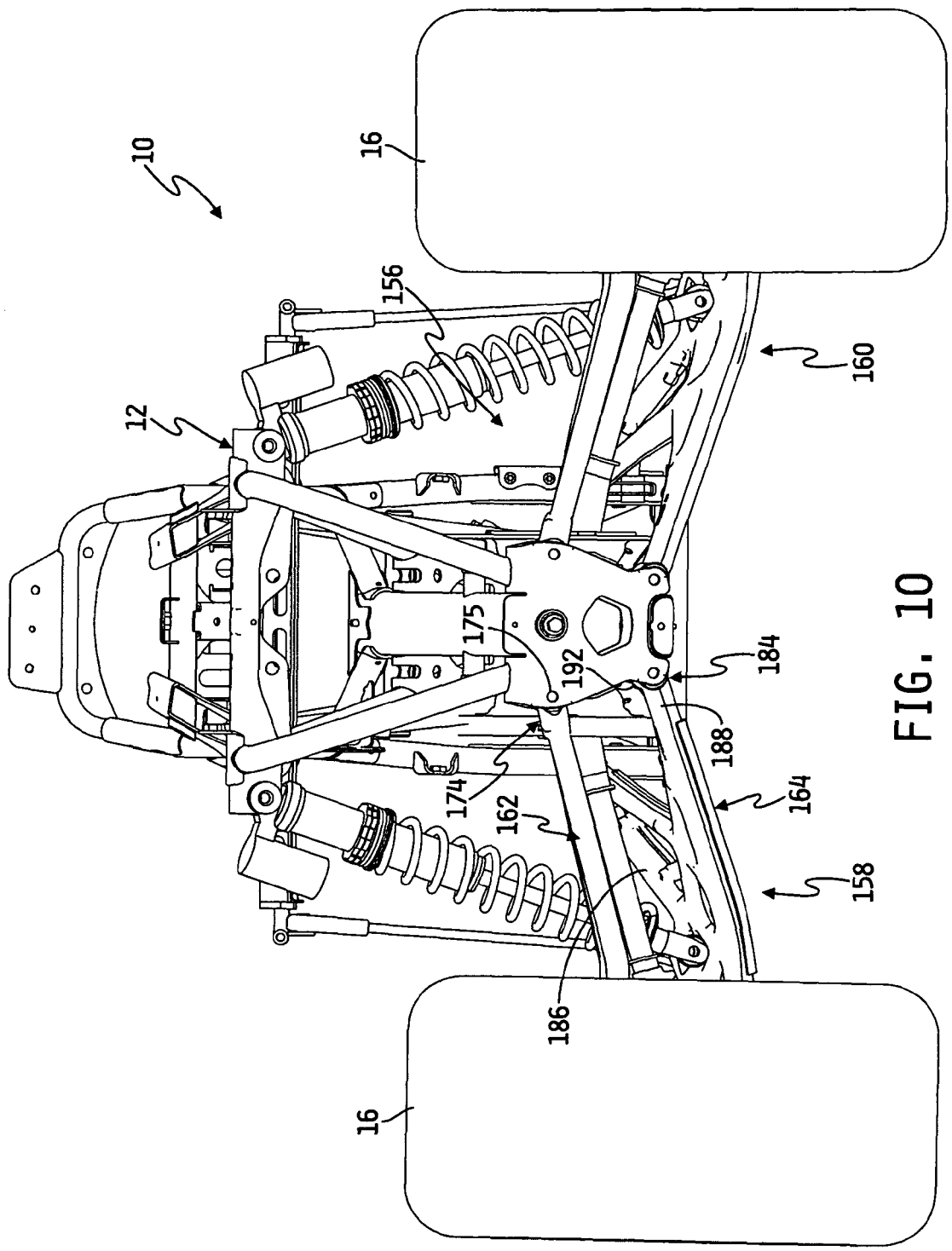
FIG. 10 is a rear, elevational view of an ATV embodying features of the present invention.
Figure 11:
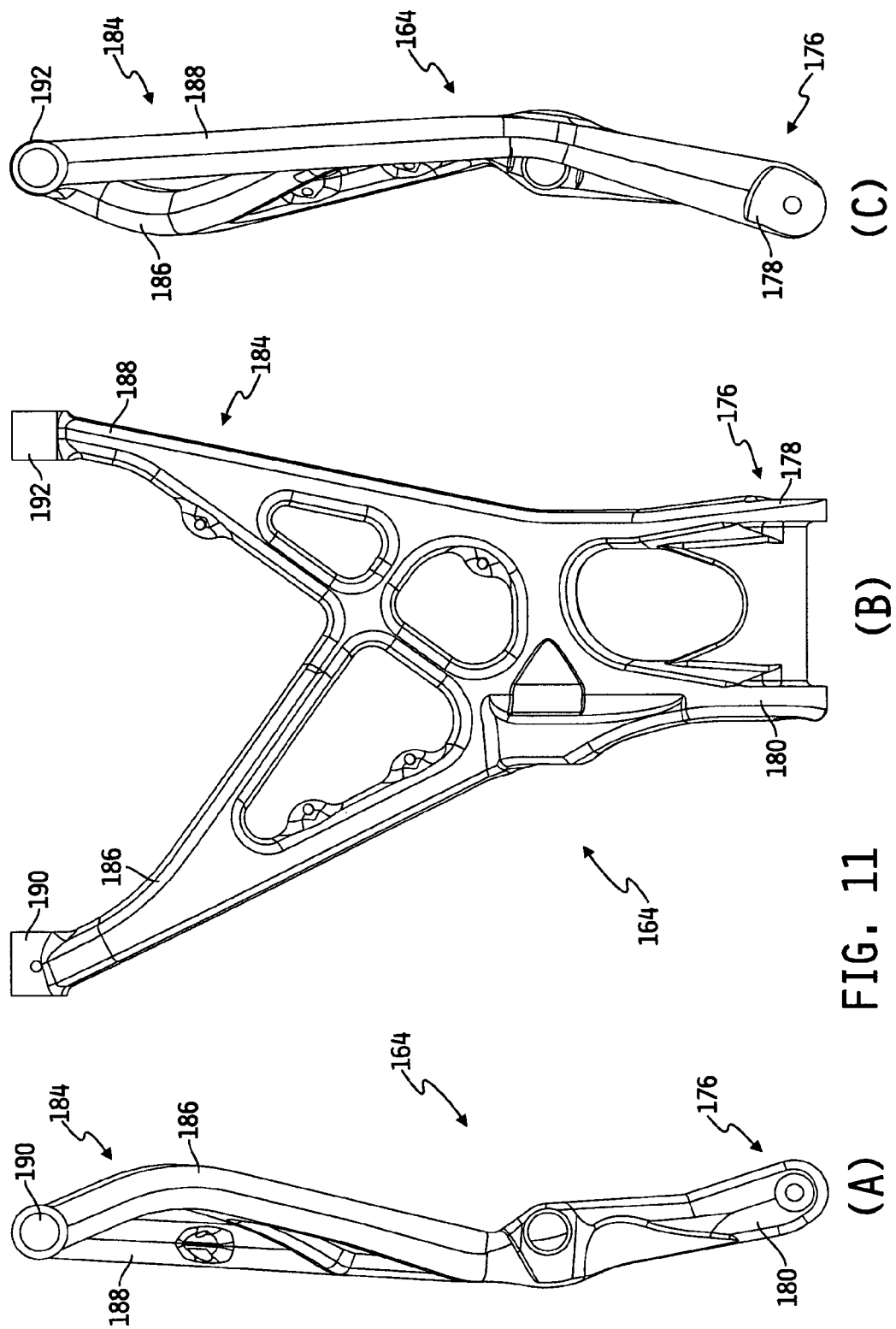
FIG. 11(A) is a side view of a control arm of the independent rear suspension of FIG. 9.
FIG. 11(B) is a top view of the control arm of FIG. 11(A).
FIG. 11(C) is another side view of the control arm of FIG. 11(A).

As indicated above, ATV 10 includes a rear independent suspension system (IRS) which permits rear wheels 16 to move vertically independent of one another while absorbing vibration and/or loading forces. One embodiment of IRS 156 is depicted in FIGS. 9 through 11(*c*). It should be noted that several components of IRS 156 are also shown in FIGS. 2 and 3, which also show drive mechanism 24. IRS 156 generally includes a pair of IRS units 158, 160 that are each movably coupled between chassis 12 and a rear wheel 16. As IRS units 158, 160 are mirror images of one another, only IRS 158 is described in detail herein.

IRS unit 158 includes an upper camber link 162, a lower control arm 164, a knuckle 166 connecting camber link 162 to control arm 164, and a wheel hub 168 attached to knuckle 166. Camber link 162 includes a first end 170 configured for pivotal coupling to knuckle 166 about a pin 172, and a second end 174 configured for pivotal coupling to chassis 12 about a pin 175 (FIG. 10). Lower control arm 164 includes a first end 176 having a pair of supports 178, 180 configured to pivotally support knuckle 166 for partial rotation about a pin 182 extending through supports 178, 180 during travel. Lower control arm 164 further includes a second end 184 having a pair of supports 186, 188 configured for pivotal attachment to chassis 12. More specifically, support 186 includes a cylindrical link 190 that is rotatably coupled to chassis 12, and support 188 includes a cylindrical link 192 that is rotatably coupled to chassis 12. As should be apparent from the foregoing, as ATV 10 is driven, each of IRS units 158, 160 permit independent, substantially vertical travel of a rear wheel 16 relative to chassis 12.

It should be understood that the described configuration of ATV 10 provides enhanced riding characteristics relative to conventional ATVs. More specifically, by incorporating DOJs 114 into sprocket hub 40 instead of using separate CV joints spaced farther away from the ATV centerline, the present design permits the use of longer half shafts 46A, 46B while maintaining a conventional distance between rear wheels 16. Increased half shaft lengths can provide a decreased angle between the half shafts, which, when accompanied by correspondingly longer IRS units 158, 160, can result in increased travel and decreased lateral motion of rear wheels 16 during vertical travel (i.e., decreased "tire scrub").

Figure 12:
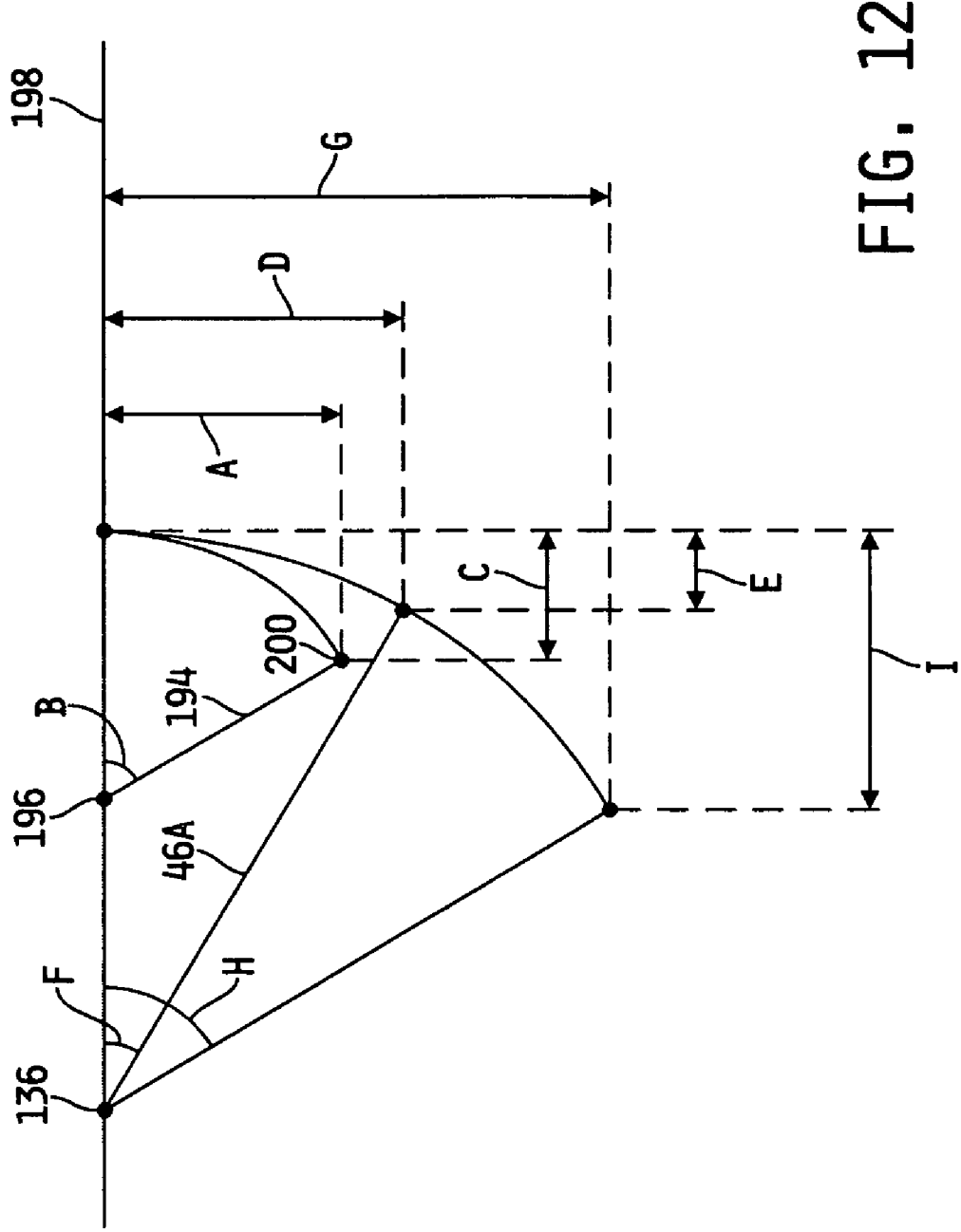
FIG. 12 is a conceptual diagram illustrating features of an ATV according to the present invention.

FIG. 12 is an abstract depiction of the geometry and resulting characteristics of increased half shaft length. It should be understood that while the following discussion of FIG. 12 focuses on half shaft lengths, the characteristics resulting from use of longer half shafts also require an independent rear suspension system having correspondingly longer linkages between the wheels and the chassis. IRS 156 is one example of such a suspension system. A conventional half shaft 194 extends from CV joint 196 of the rear drive system (the centerline of which is represented by horizontal line 198) to CV joint 200 of the rear wheel. As shown, the maximum travel "A" of half shaft 194 corresponds to the vertical distance CV joint 200 traverses through the maximum travel angle "B." As is also shown, travel "A" corresponds to tire scrub "C," (i.e., the horizontal distance traveled by CV joint 200).

Half shaft 46A of ATV 10 is longer than half shaft 194 in part because CV joint 136 is moved farther inwardly toward the centerline of ATV 10 than conventional CV joint 196 (the differences are exaggerated for clarity in the figure). As a result, half shaft 46A may provide travel "D," which is greater than travel "A" and tire scrub "E," which is less than tire scrub "C," using a reduced travel angle "F." As is well known in the art, increased travel provides improved traction and a smoother ride over rough terrain, and decreased tire scrub reduces wheel wear, and decreases the occurrence of suspension bind-ups, wherein trail ruts or other obstacles prevent lateral movement of the rear wheels.

FIG. 12 also demonstrates that, depending upon the design of the suspension system, a longer half shaft 46A may provide substantially increased travel "G" if half shaft 46A is permitted to move through a maximum travel angle "H" that is equal to travel angle "B." Of course, the increased travel "G" also corresponds to increased tire scrub "I" relative to tire scrub "C."

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A drive mechanism for a vehicle having a chassis, an engine coupled to the chassis, and a pair of rear wheels, the drive mechanism including:

a sprocket hub having an interior surface defining a plurality of ball grooves;

a pair of constant velocity joints mounted within the interior surface in engagement with the ball grooves, each joint being connected to a half shaft that is coupled to one of the rear wheels;

a sprocket connected to the sprocket hub such that at least a portion of one of the joints is between the sprocket and the other of the joints and at least one of the half shafts extends through the sprocket; and an external chain extending between the engine and the sprocket to cause rotation of the sprocket hub, which rotation is transferred through the joints and the half shafts to rotate the rear wheels.

2. The drive mechanism of claim 1, wherein one end of the sprocket hub is substantially bell-shaped.

3. The drive mechanism of claim 1, wherein the interior surface is formed by a substantially cylindrical body of the sprocket hub.

4. The drive mechanism of claim 1, further including a brake hub rigidly coupled to the sprocket hub.

5. The drive mechanism of claim 4, wherein a brake rotor is connected to one end of the brake hub.

6. The drive mechanism of claim 1, further including a housing coupled to the chassis and a bearing mounted within the housing, the sprocket hub being mounted for rotation within the bearing.

7. The drive mechanism of claim 1, wherein one of the half shafts extends through a central opening of the sprocket.

8. The drive mechanism of claim 1, further including an independent rear suspension coupled between the chassis and the rear wheels.

9. A vehicle, including:
a chassis;
an engine coupled to the chassis, the engine including a drive sprocket;
an independent rear suspension;
a rear drive mechanism including a pair of dual offset joints mounted in a sprocket hub, each joint being connected to a half shaft coupled to a wheel, and a driven sprocket connected to the sprocket hub at a location offset from a centerline of the vehicle, and a brake disk connected to the sprocket hub at the opposite side and offset from a centerline of the vehicle, the two half shafts being driven at points intermediate the driven sprocket and the brake disk, one half shaft extending through the sprocket and one half shaft extending through the brake disk; and
an external chain coupled to the drive sprocket and the driven sprocket to transfer rotational movement of the drive sprocket to the driven sprocket, thereby causing rotation of the sprocket hub, the dual offset joints, the half shafts, and the wheels.

10. The vehicle of claim 9, wherein the sprocket hub includes a substantially cylindrical body and a bell-shaped end, the driven sprocket being connected to mounting flanges on the bell-shaped end.

11. The vehicle of claim 10, wherein the cylindrical body defines an uninterrupted internal volume, the dual offset joints being disposed within the uninterrupted internal volume.

12. The vehicle of claim 9, wherein the independent rear suspension includes a pair of IRS units, each IRS unit including a knuckle connected to one of the wheels, a camber link extending between the knuckle and the chassis, and a lower control arm extending between the knuckle and the chassis.

13. The vehicle of claim 9, wherein the distance between the driven sprocket and the centerline is greater than the distance between either of the joints and the centerline.

14. The vehicle of claim 9, wherein the drive mechanism further includes a brake hub connected to the sprocket hub for rotation therewith, the brake hub including a brake rotor positioned for engagement by a brake caliper to impede rotation of the sprocket hub.

15. The vehicle of claim 9, wherein the sprocket hub rotates on bearings mounted within a housing coupled to the chassis.

16. The vehicle of claim 9, wherein the driven sprocket is positioned opposite one of the joints from the centerline.

17. A drive mechanism for a vehicle having an engine, the mechanism including:
a sprocket hub having a body and a bell-shaped end with a sprocket mounted thereto;
a chain for transferring power from the engine to the sprocket;
a half shaft driven by the sprocket hub and extending through the sprocket; and
an inner boot having an end that seals against an outer surface of the half shaft and an attachment end coupled to an inner surface of the bell-shaped end.

18. The drive mechanism of claim 17, further including a pair of dual offset joints mounted within the body of the sprocket hub.

19. The drive mechanism of claim 18, wherein the dual offset joints are positioned adjacent the centerline of the vehicle whereas the sprocket is offset from the centerline of the vehicle.

20. The drive mechanism of claim 17, wherein the attachment end of the boot includes an outer lip having a reinforcement ring coupled thereto.

21. The drive mechanism of claim 20, wherein the inner surface of the bell-shaped end includes a circumferential seat formed therein, the outer lip of the boot attachment end being positioned against the seat.

22. The drive mechanism of claim 21, wherein the inner surface further includes a circumferential groove adjacent the seat for receiving a snap ring, the snap ring retaining the outer lip against the seat to thereby couple the boot to the inner surface.

23. A drive mechanism for a vehicle having an engine, the mechanism including:
a sprocket hub having a body and a bell-shaped end with a sprocket mounted thereto;
a chain for transferring power from the engine to the sprocket;
a half shaft driven by the sprocket hub; and
an inner boot having an end that seals against an outer surface of the half shaft and an attachment end coupled to an inner surface of the bell-shaped end;
wherein the attachment end of the boot includes an outer lip having a reinforcement ring coupled thereto, the inner surface of the bell-shaped end includes a circumferential seat formed therein, with the outer lip of the boot attachment end being positioned against the seat, and the inner surface further includes a circumferential groove adjacent the seat for receiving a snap ring, the snap ring retaining the outer lip against the seat to thereby couple the boot to the inner surface.

24. The drive mechanism of claim 17, further including a pair of dual offset joints mounted within the body of the sprocket hub.

25. The drive mechanism of claim 18, wherein the dual offset joints are positioned adjacent the centerline of the vehicle whereas the sprocket is offset from the centerline of the vehicle.

* * * * *